(12) United States Patent
Cruz-Rios et al.

(10) Patent No.: US 7,039,774 B1
(45) Date of Patent: May 2, 2006

(54) MEMORY ALLOCATION USING A MEMORY ADDRESS POOL

(75) Inventors: Jorge Cruz-Rios, Los Altos, CA (US); Rami Rahim, Sunnyvale, CA (US); Venkateswarlu Talapaneni, Cupertino, CA (US); Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 859 days.

(21) Appl. No.: 10/062,424

(22) Filed: Feb. 5, 2002

(51) Int. Cl.
*G06F 12/00* (2006.01)

(52) U.S. Cl. .................... 711/159; 711/154; 711/156; 711/163; 711/165; 710/52; 710/56; 709/226

(58) Field of Classification Search ................ 711/154, 711/159, 156, 163, 165; 710/52, 56; 709/226
See application file for complete search history.

(56) References Cited

U.S. PATENT DOCUMENTS

| | | | | |
|---|---|---|---|---|
| 5,491,808 A | * | 2/1996 | Geist, Jr. .................... | 711/100 |
| 5,493,652 A | * | 2/1996 | Koufopavlou et al. ...... | 711/170 |
| 5,784,649 A | * | 7/1998 | Begur et al. ................. | 710/52 |
| 6,085,296 A | * | 7/2000 | Karkhanis et al. ........... | 711/147 |
| 6,345,296 B1 | * | 2/2002 | McCrory et al. ........... | 709/228 |

* cited by examiner

*Primary Examiner*—Stephen C. Elmore
(74) *Attorney, Agent, or Firm*—Harrity Snyder, LLP

(57) ABSTRACT

A system for managing memory includes a memory and a memory allocation unit. The memory stores a pool of memory addresses for writing data to the memory and stores a counter value. The memory allocation unit retrieves memory addresses from the pool in response to write requests from data sources. The memory allocation unit further replenishes the memory addresses in the pool when the pool is emptied and increments the counter value in response to each replenishment of the memory addresses in the pool.

29 Claims, 9 Drawing Sheets

| ALLOCATION POINTER TABLE 210 | |
|---|---|
| ALLOCATION POINTER 315 | SEGMENT TAG 405 |
| aptr_0 | seg_tag_0 |
| aptr_1 | seg_tag_1 |
| aptr_2 | seg_tag_2 |
| ... | ... |
| aptr_n-1 | seg_tag_n-1 |
| aptr_n | seg_tag_n |

SEG_0, SEG_1, SEG_2, ... SEG_n-1, SEG_n — SEGMENT ID 410

FIG. 4

MEMORY ALLOCATION USING A MEMORY ADDRESS POOL

BACKGROUND OF THE INVENTION

A. Field of the Invention

The present invention relates generally to memory management systems and, more particularly, to systems and methods for allocating memory using a memory address pool.

B. Description of Related Art

Memory management systems conventionally use memory address pools, commonly called freelists, for managing memory. In many memory management systems, memory is divided into blocks with the addresses of these blocks stored in a secondary memory array to form a free memory address pool. This free address pool can be managed as a first-in-first-out (FIFO) queue. Addresses are removed from the free address pool when a block is allocated in memory for writing data. Addresses are then returned to the free address pool when a block is de-allocated from memory after, for example, the data is read out of memory.

One problem that occurs with the use of a free address pool is when a memory "leak" occurs that causes a memory block to not be de-allocated. When memory leaks occur, there is the possibility that the free address pool will become depleted. This can create serious problems, since the system will be unable to allocate any further memory until blocks are de-allocated. Conventionally, memory management systems have been designed to handle memory leaks by "aging" memory blocks and returning the block addresses to the free address pool after a certain period of time. This, solution, however, also has its own attendant problems. When memory blocks are "aged," requests may subsequently be made for a memory block that has already been de-allocated because of its age. This problem is called "aliasing." Aliasing has two detrimental effects. First, the data integrity cannot be guaranteed, since data that is read might not be valid data. Second, the free address pool may become "polluted" because a memory block might have multiple addresses in the address pool.

Therefore, there exists a need for memory management systems and methods that can implement free address pools for reading and writing data to memory, without incurring aliasing and address pool pollution.

SUMMARY OF THE INVENTION

Consistent with the principles of the invention disclosed and claimed herein, these and other needs are addressed by providing tags, or counter values, that permit the aging of memory addresses extracted from a memory address pool. Implementations consistent with the principles of the invention "age" memory addresses extracted from the memory address pool through the provision of a tag, or counter value, which can be incremented when the pool is emptied of all addresses and then replenished. This tag can be passed to a data source requesting a memory write and then compared with a current address pool tag when the data source requests a data read. Implementations consistent with the principles of the invention may additionally "age" memory addresses through the provision of a buffer tag, or buffer counter value, which can be incremented when all memory addresses stored in a buffer have been written to. This buffer tag can also be passed to a data source requesting a memory write and then compared with a current tag when the data source requests a data read. Through the use of an address pool tag and a buffer tag, implementations consistent with the principles of the present invention can "age" memory blocks without incurring aliasing and address pool pollution.

In accordance with the principles of the invention as embodied and broadly described herein, a method of managing memory includes maintaining a pool of memory addresses for writing data to a memory, retrieving memory addresses from the pool in response to write requests from data sources, replenishing the memory addresses in the pool when the pool is emptied, and incrementing a first counter value in response to each replenishment of the memory addresses in the pool.

Another implementation consistent with the principles of the invention includes a method of managing memory that includes maintaining a pool of memory addresses for writing data to a memory, retrieving memory addresses from the pool and storing the retrieved memory addresses in a buffer, writing data to memory addresses stored in the buffer, and incrementing a first counter value when data has been written to all the addresses stored in the buffer.

Yet another implementation consistent with the principles of the invention includes a data structure encoded on a computer-readable medium that further includes first data comprising a pool of addresses for at least one of writing and reading data to and from a memory, and second data comprising a counter value that indicates a number of times the pool has been emptied of memory addresses and then replenished.

A further implementation consistent with the principles of the invention includes a data structure encoded on a computer-readable medium that further includes first data comprising a list of memory addresses obtained from a memory address pool, and second data comprising a counter value that indicates a number of times data has been written to all the memory addresses in the list.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 is an exemplary diagram of an indirection table consistent with the principles of the invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents of the claim limitations.

Systems and methods consistent with the principles of the invention permit the implementation of free address pools without aliasing or address pool pollution. Aliasing and address pool pollution are avoided through the provision of address pool tags and segment tags that enable memory addresses extracted from an address pool to be "aged." By comparing current address pool tags and segment tags with corresponding tags passed to a data source that has requested a memory write, implementations consistent with the principles of the invention prevent data from being read from memory that does not correspond to the request and further prevent any block in memory from having multiple addresses.

Exemplary Memory Allocation System

Figure 1:
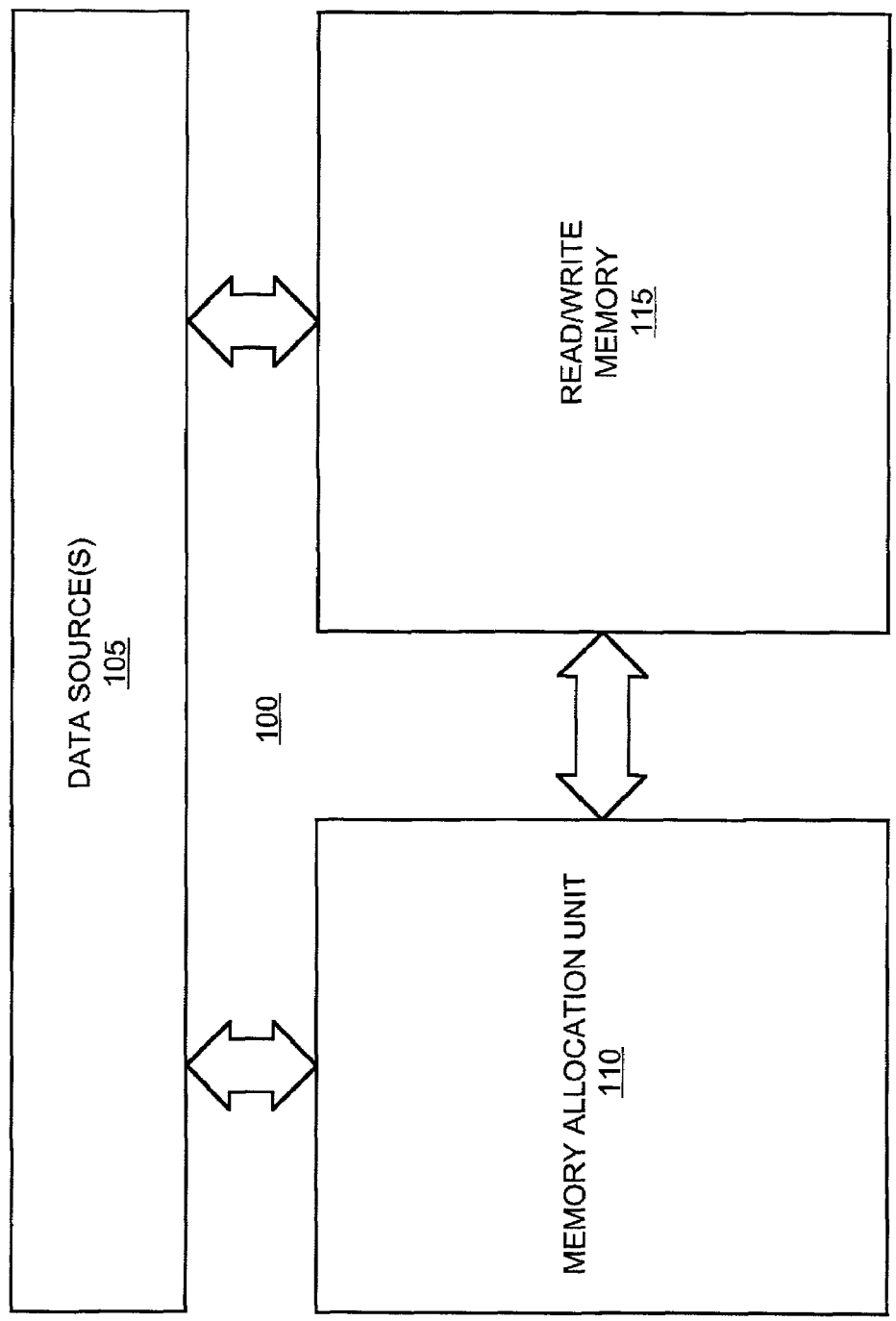
FIG. 1 is an exemplary diagram of a memory allocation system consistent with the principles of the invention.

FIG. 1 is a diagram of an exemplary system 100 for allocating memory to store data received from a source of data. System 100 may include a network device, such as a router or bridge. System 100 may further include several devices that may be connected in a distributed fashion. System 100 may include a data source(s) 105, a memory allocation unit 110, and a read/write memory 115. Data source 105 may include any type of system and/or device that requires the storage of data. Data source 105 may include, for example, a data processing system, an interface of a network routing device, or the like. Memory allocation unit 110 may direct the allocation of memory locations for storing data received from data source(s) 105. Read/write memory 115 may include addressable memory locations for storing data from data source 105. Memory locations in read/write memory 115 may be addressed by blocks, thus permitting blocks of data to be stored in a location corresponding to a single memory address. Read/write memory 115 may include one or more memories (e.g., random access memories (RAMs)) that provide permanent or semi-permanent storage of data. Read/write memory 115 can also include large-capacity storage devices, such as a magnetic and/or optical device. Read/write memory 115 may store data from data source(s) 105 according to commands from memory allocation unit 110.

Exemplary Memory Allocation Unit

Figure 2:
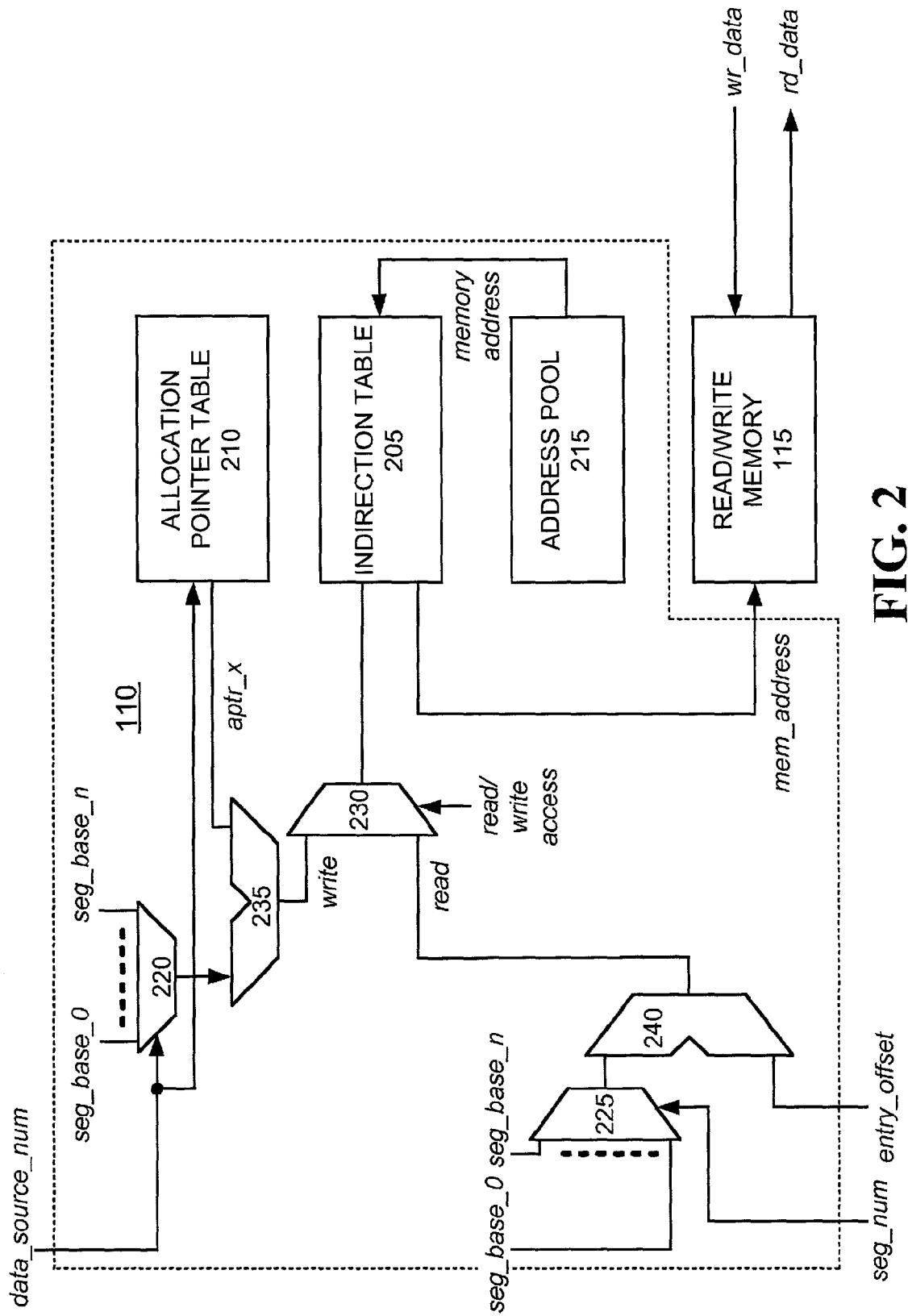
FIG. 2 is a diagram of exemplary components of a block allocation unit and memory according to an implementation consistent with the principles of the invention.

FIG. 2 is a diagram of exemplary components of memory allocation unit 110 according to an implementation consistent with the principles of the invention. Memory allocation unit 110 may include an indirection table 205, an allocation pointer table 210 and a free address pool 215. Indirection table 205 may include entries that contain addresses for storing and retrieving data in read/write memory 115. Allocation pointer table 210 may include pointers that point to entries in indirection table 205. Free address pool 215 may contain a pool of free memory address locations in read/write memory 115 at which data can be stored.

Memory allocation unit 110 may further include multiplexers 220, 225 and 230 and adders 235 and 240. MUX 220 may multiplex a segment base entry (seg_base_x) in indirection table 205 corresponding to the data source number (data_source_num). Thus, data_source_num0 corresponds to seg_base 0, data_source_num1 corresponds to seg_base_1, etc. The segment base entry (seg_base_x) may indicate a first entry in the segment of indirection table corresponding to the data source number (i.e., each data source number may be allocated its own segment in indirection table 205). MUX 225 may multiplex a segment base entry (seg_base_x) in indirection table 205 corresponding to a received segment number (seg_num). Adder 235 may sum the segment base entry value (seg_base_x) with an allocation pointer value (aptr_x) retrieved from allocation pointer table 210. Adder 240 may sum the segment base entry value (seg_base_x) with an entry offset value (entry_offset) received from the data source 105 requesting a memory read. MUX 230 may multiplex summed segment entry location values from either adder 235 or 240 based on read/write access commands. MUX 230 may pass a summed segment entry location from adder 235 in response to a write access command. MUX 230 may pass a summed segment entry location from adder 240 in response to a read access command.

Exemplary Indirection Table

Figure 3:
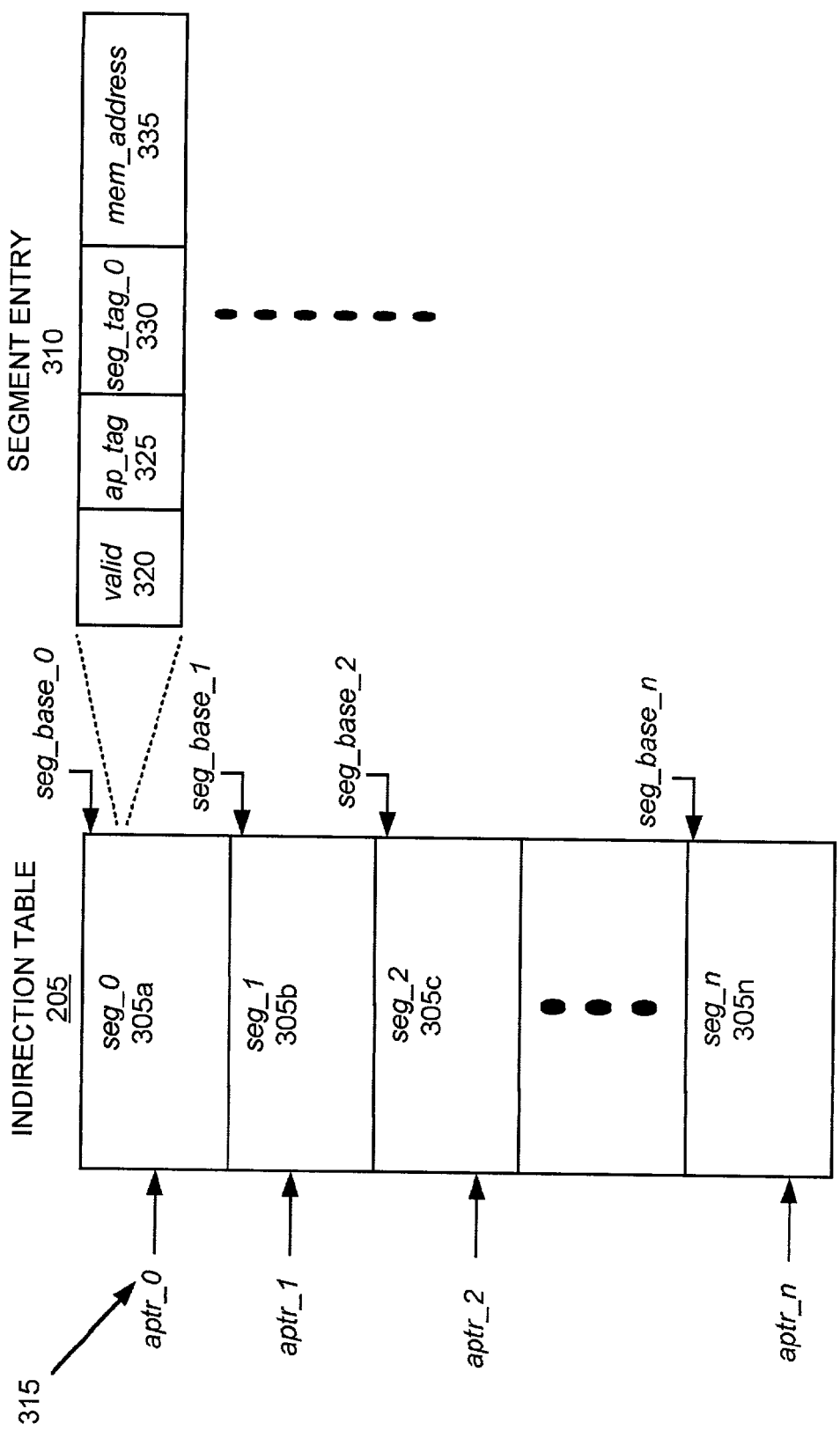
FIG. 3 is an exemplary diagram of an allocation pointer table consistent with the principles of the invention.

FIG. 3 is an exemplary diagram of indirection table 205 according to an implementation consistent with the principles of the invention. Indirection table 205 may include segments seg_0 305a through seg_n 305n that may be assigned to a data source of data sources 105. Each segment 305 may include multiple segment entries 310, each of which may further include one or more fields. Each segment 305 of indirection table 205 may be managed as a circular buffer. An allocation pointer (aptr_x) 315 can be associated with each segment 305 and may point to an active entry 310 in a corresponding segment 305.

Each segment entry 310 may include a validity (valid) field 320, an address pool tag (ap_tag) field 325, a segment tag (seg_tag_x) field 330, and a memory address (mem_address) field 335. valid field 320 may indicate whether the memory address specified in mem_address field 335 has been de-allocated ap_tag field 325 may store the value of an address pool tag 510 (FIG. 5) that was contained in free address pool 215 at the time the memory address specified in mem_address field 335 was allocated seg_tag_x field 330 may store the value of segment tag 405 that was contained in allocation pointer table 210 at the time the memory address specified in mem_address field 335 was allocated mem_address field 335 may include an address location in read/write memory 115 that has been retrieved from address pool 215.

Exemplary Allocation Pointer Table

FIG. 4 is an exemplary diagram of allocation pointer table 210 according to an implementation consistent with the principles of the invention. Allocation pointer table 210 may include allocation pointers 315 and associated segment tags 405 indexed by segment identifiers 410. Each allocation pointer 315 points to a segment entry 310 in a corresponding segment of indirection table 205. Each segment tag 405 indicates a number of times all segment entries 310 in the corresponding segment have been utilized.

Exemplary Free Address Pool

Figure 5:
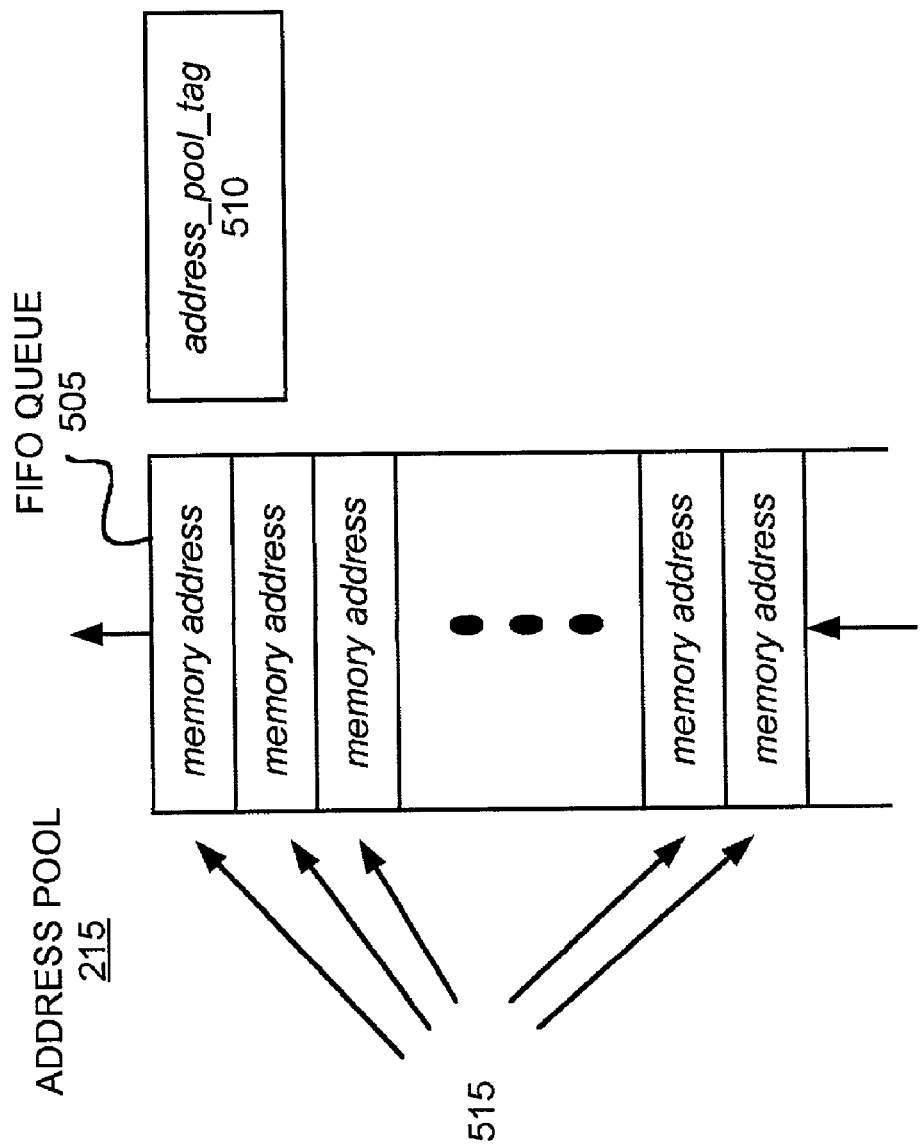
FIG. 5 is an exemplary diagram of an address pool consistent with the principles of the invention.

FIG. 5 is an exemplary diagram of free address pool 215 according to an implementation consistent with the principles of the invention. Free address pool 215 may include a FIFO queue 505 and an address pool tag (address_pool_tag) 510. FIFO queue 505 may include a pool of memory address locations in read/write memory 115 that are available for storing data. The pool of memory address locations may be stored in queue 505 on a first-in-first-out basis. address_pool_tag 510 may indicate a number of times the memory addresses stored in FIFO queue 505 have been depleted and then replenished.

Exemplary Memory Allocation Process

Figure 6:
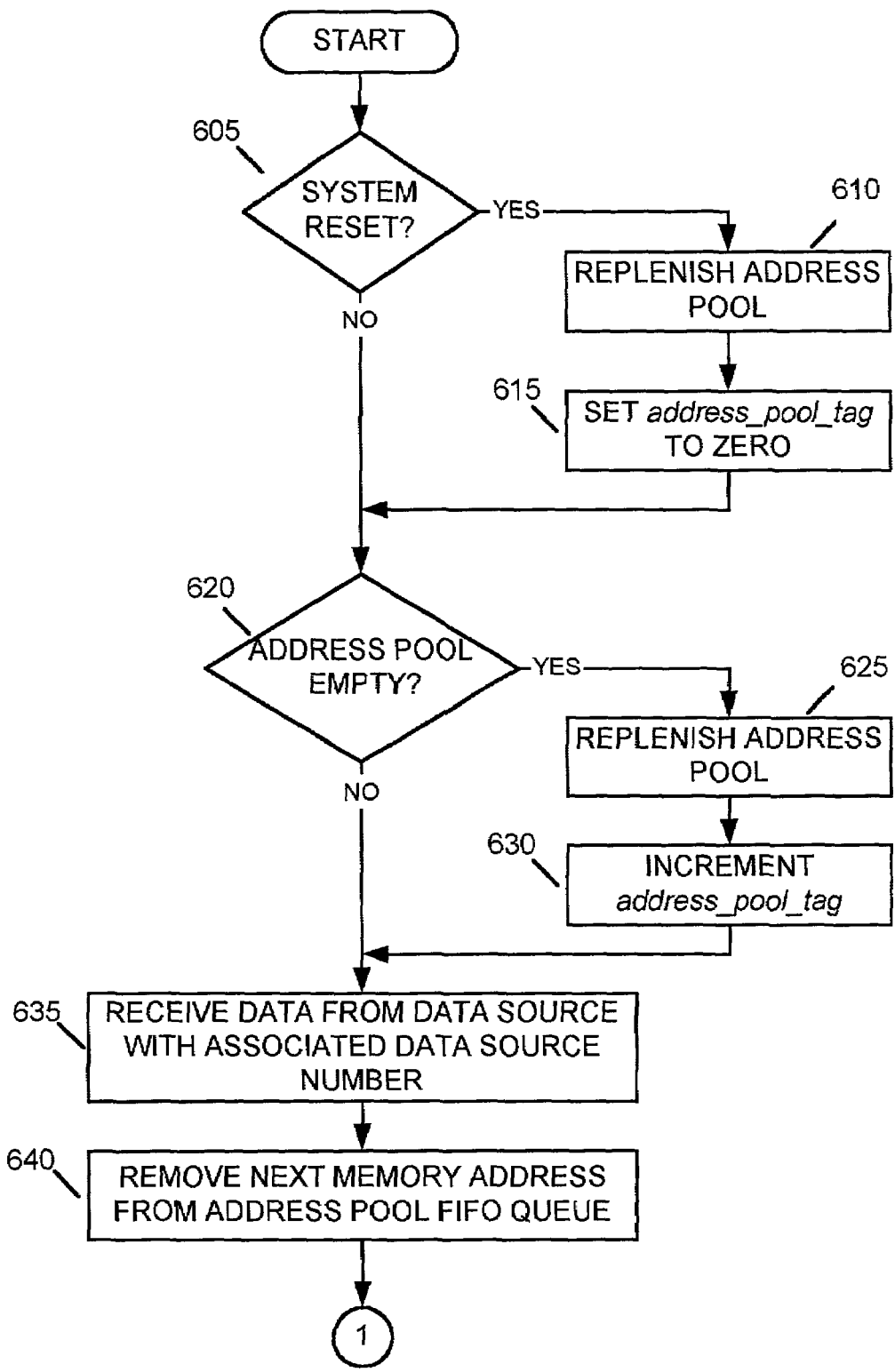
FIGS. 6–8 are exemplary flowcharts of a memory allocation process consistent with the principles of the invention.
Figure 7:
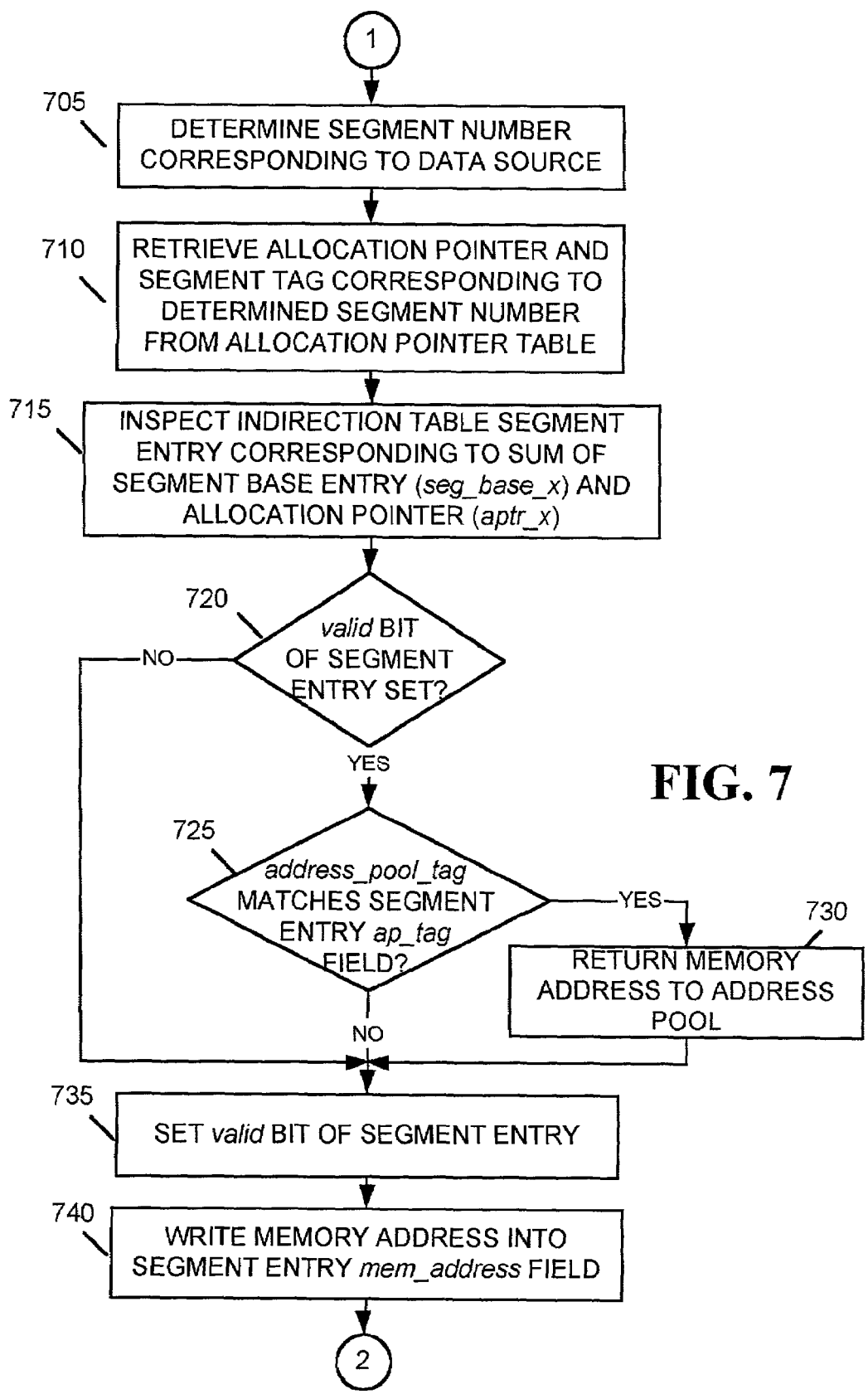
Figure 8:
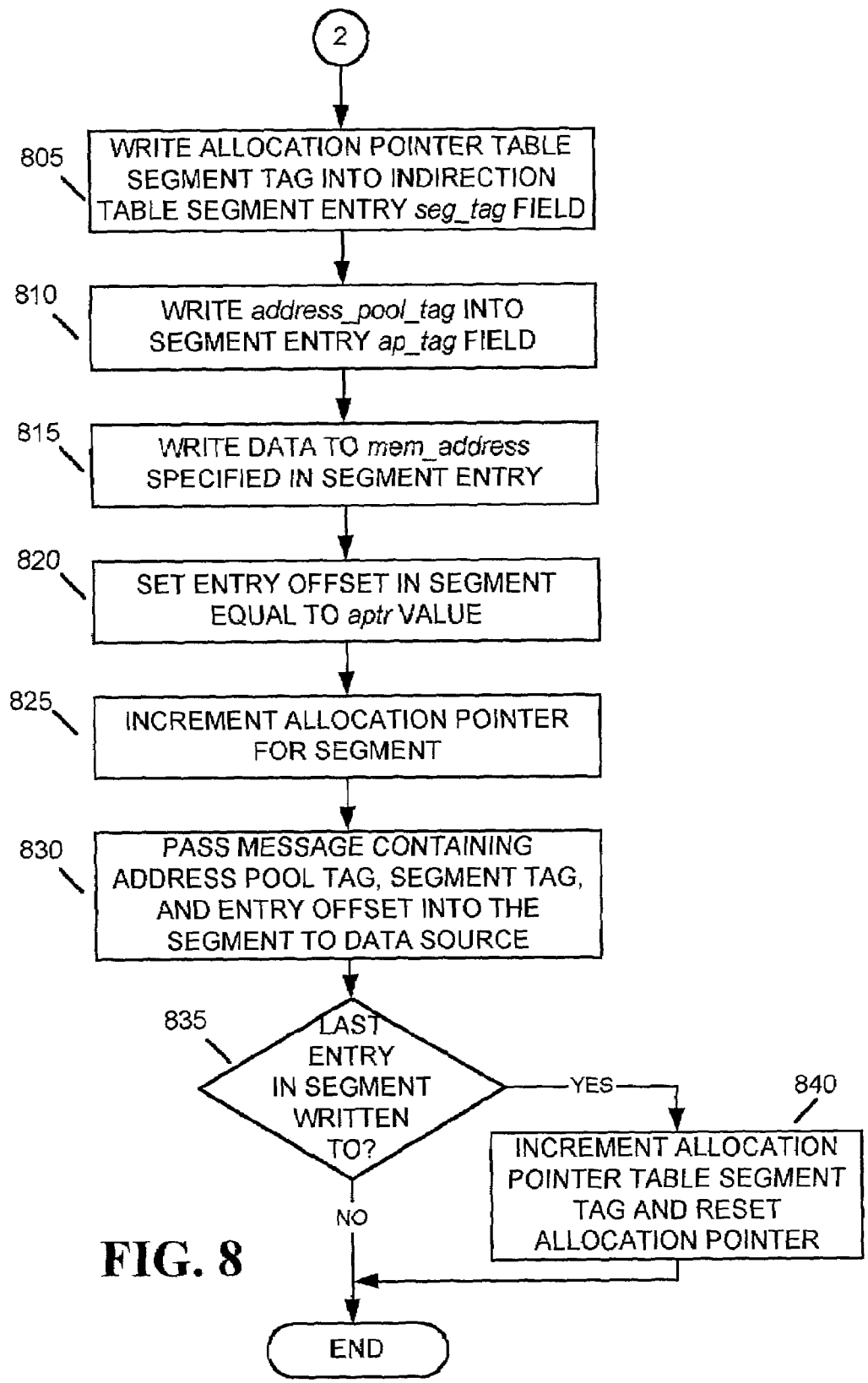

FIGS. 6–8 are flowcharts of an exemplary memory allocation process that may be implemented by a system, such as system 100, consistent with the principles of the invention. The process may begin by determining whether there has been a system reset (act 605). For example, a system reset may be initiated at system power-up or re-boot. If there has been a system reset, the supply of memory addresses in free address pool 215 may be replenished (act 610). address_pool_tag 510 in free address pool 215 may further be set to zero (act 615). If there has been no system reset, a determination of whether free address pool 215 has been emptied of memory addresses may be made (act 620). If empty, free address pool 215 may be replenished with memory addresses (act 625). Free address pool 215 may be replenished with the same addresses that were previously removed from the pool. address_pool_tag 510 of free address pool 215 may also be incremented (act 630).

Data associated with a data source number may then be received from data source(s) 105 (act 635). The data source number may identify the source of the data, such as, for example, an interface of a data routing device. The data source number may additionally identify a stream of data. A memory address may be removed from the top of the address pool FIFO queue 505 (act 640). A segment number 305 corresponding to the data source number may be determined (act 705)(FIG. 7). An allocation pointer 315 and segment tag 405 corresponding to the determined segment number 305 may be retrieved from allocation pointer table 210 (act 710).

An indirection table 205 segment entry 310, corresponding to a sum of an appropriate segment base entry (seg_base_x) value and the retrieved allocation pointer (aptr_x 315) value, may next be inspected (act 715). To inspect the indirection table 120 segment entry 310, MUX 220 may multiplex a segment base entry (seg_base_x) corresponding to the data source's data source number. Adder 235 may sum the multiplexed segment base entry value with the retrieved allocation pointer 315 value to provide the indirection table 205 segment entry 310 that is to be inspected. If inspection of the segment entry 310 determines that the entry valid bit 320 is not set, then the process may continue at act 735 below. If inspection of the segment entry 310 determines that the valid bit 320 is set, then a determination of whether the address pool tag (address_pool_tag 510) matches the segment entry 310 ap_tag 325 may be made (act 725). If so, the memory address may be returned to the free address pool 215 and the process may continue at act 735 below. If address_pool_tag 510 of free address pool 215 does not match the segment entry 310 ap_tag 325, then the valid bit of the segment entry 310 may be set (act 735). The memory address removed from FIFO queue 505 may further be written into the segment entry 310 mem_address field 335 (act 740).

Turning to FIG. 8, allocation pointer table 210 segment tag 405, corresponding to determined segment number 305, may be written into indirection table 205 segment entry 310 seg_tag_x field 330 (act 805). Free address pool 215 address_pool_tag 510 may further be written into segment entry 310 ap_tag field 325 (act 810). The received data may be written to the memory address (mem_address field 335) specified in segment entry 310 (act 815). An entry offset value (entry_offset), that contains a pointer into the segment, may be set equal to the allocation pointer value aptr 315 (act 820). Allocation pointer 315, corresponding to determined segment number 305, may then be incremented (act 825).

A message that contains the address pool tag address_pool_tag 510, the segment tag seg_tag_x 405, and the entry offset (entry_offset) into the segment may be passed to data source 105 (act 830). A determination may be made as to whether the system has written to the last entry in the segment identified by segment number 305 (act 835). If so, allocation pointer table 210 segment tag 405 may be incremented and allocation pointer 315 may be reset (act 840). Subsequent to acts 835 and 840, the memory allocation process may complete.

Exemplary Memory De-Allocation Process

Figure 9:
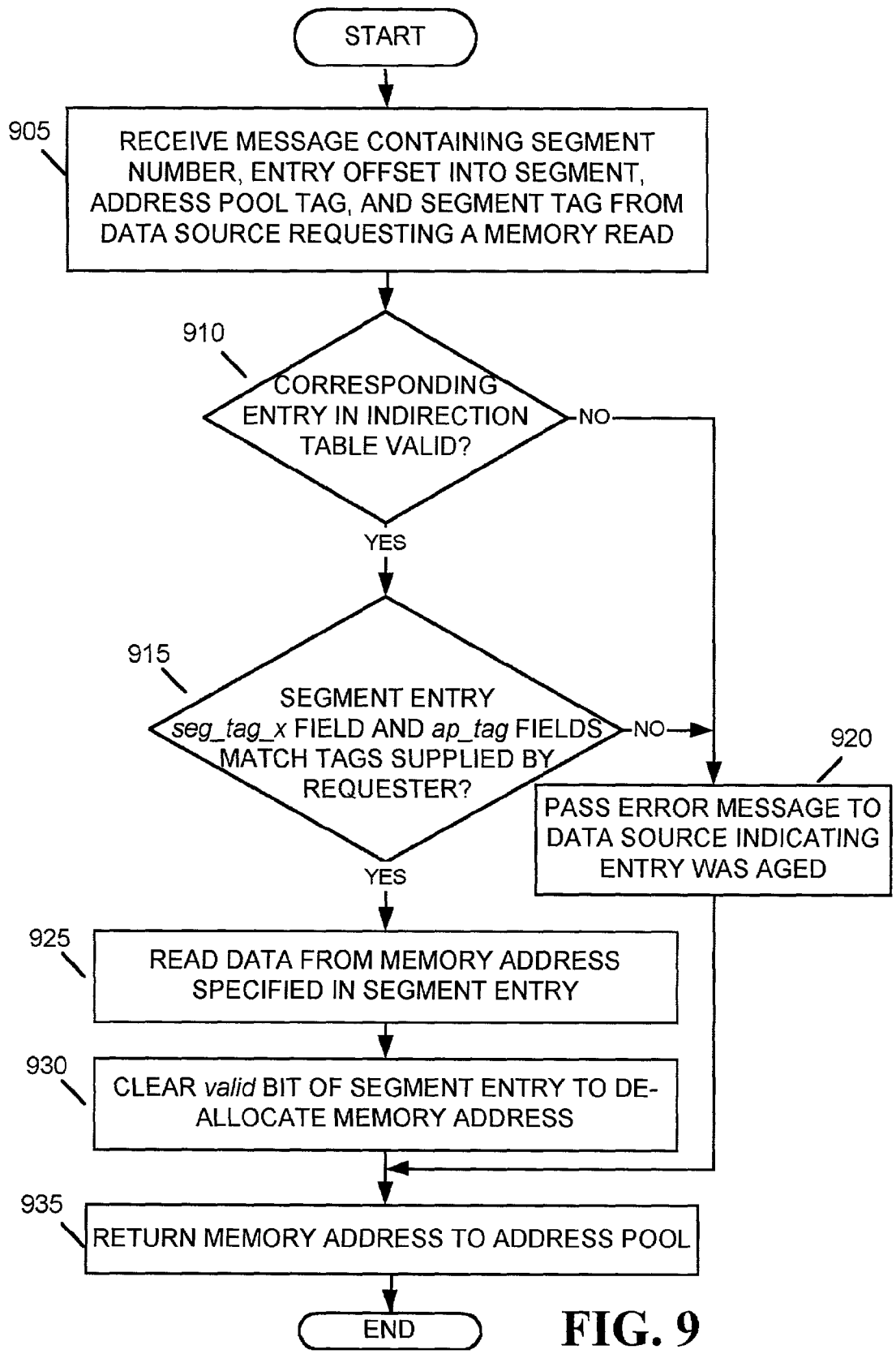
FIG. 9 is an exemplary flowchart of a memory de-allocation process consistent with the principles of the invention.

FIG. 9 is an exemplary flowchart of a memory de-allocation process that may be implemented by a system, such as system 100, consistent with the principles of the invention. The process may begin with the reception of a message containing a segment number 305, entry offset (entry_offset) into the segment identified by the segment number 305, address pool tag 510, and a segment tag 405 sent from a data source 105 requesting a memory read (act 905). A determination may be made whether valid field 320 in a segment entry 310 in indirection table 205, corresponding to received segment number 305 and the entry_offset value, indicates that segment entry 310 is valid (act 910). To determine an appropriate segment entry 310 in indirection table 205, MUX 225 may multiplex a segment base entry (seg_base_x) corresponding to the received segment number 305. Adder 240 may sum the multiplexed segment base entry value with the received entry offset value (entry_offset) to provide the segment entry 310 corresponding to the received segment number 305 and entry_offset value. If the valid field 320 in the segment entry 310 is not valid, the process may continue at act 920 below. If valid field 320 indicates that segment entry 310 in indirection table 205 is valid, then a determination may be made whether segment tag field 330 and address pool tag field (ap_tag) 325 for that segment entry 310 match the corresponding tags supplied by the requesting data source (act 915). If not, an error message may be passed to the requesting data source indicating that segment entry 310 has been "aged" (act 920). If the tags match, data may be read from the memory address in read/write memory 135 specified in segment entry 310 mem_address 335 field (act 925) valid bit 320 of segment entry 310 may further be cleared to de-allocate the memory address (act 930), and the memory address may be returned to address pool 215 (act 935) to complete the memory de-allocation process.

CONCLUSION

Consistent with the principles of the present invention, memory allocation using free address pools may be implemented to avoid the well-known aliasing and address pool pollution problems. Through the provision of address pool tags and segment tags, implementations consistent with the principles of the invention may permit memory addresses extracted from an address pool to be "aged." By comparing current address pool tags and segment tags with corresponding tags passed to a data source that has requested a memory write, implementations consistent with the principles of the invention prevent data from being read from memory that does not correspond to the request and further prevent any block in memory from having multiple addresses.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 6–9, the order of the acts may differ or be performed in parallel in other implementations consistent with the present invention. No element, act, or instruction used in the description of the principles of the invention should be construed as critical unless explicitly described as such. Also as used herein, the article "a" is intended to include one or more items. Where only one item is intended, the term "one" or similar language is used.

The scope of the invention is defined by the claims and their equivalents.

The invention claimed is:

1. A method of managing memory, comprising:
   maintaining a pool of memory addresses for writing data to a memory;
   retrieving memory addresses from the pool in response to write requests from data sources;
   replenishing the memory addresses in the pool when the pool is emptied; and
   incrementing a first counter value in response to each replenishment of the memory addresses in the pool.

2. The method of claim 1, further comprising:
   determining whether a reset has been initiated; and
   replenishing the memory addresses in the pool and resetting the first counter value based on the determination.

3. The method of claim 1, further comprising:
   storing the retrieved memory addresses in a buffer;
   writing data to the memory addresses stored in the buffer; and
   incrementing a second counter value when the data has been written to all the addresses stored in the buffer.

4. The method of claim 3, further comprising:
   passing the first and second counter values to the data sources in response to each of the write requests.

5. The method of claim 4, further comprising:
   receiving read requests from the data sources, each of the read requests comprising the first and second counter values; and
   returning error messages to the data sources, indicating that the data written to the memory addresses has been aged, based on the read request first and second counter values.

6. A network device, comprising:
   a memory configured to:
      store a pool of memory addresses for writing data to the memory, and
      store a first counter value; and
   a memory allocation unit configured to:
      retrieve memory addresses from the pool in response to write requests from data sources,
      replenish the memory addresses in the pool when the pool is emptied, and
      increment the first counter value in response to each replenishment of the memory addresses in the pool.

7. The network device of claim 6, the memory allocation unit further configured to:
   determine whether a reset has been initiated; and
   replenish the memory addresses in the pool and reset the first counter value based on the determination.

8. The network device of claim 6, the memory further configured to:
   maintain a buffer, and
   store a second counter value; and
   the memory allocation unit further configured to:
      store the retrieved memory addresses in the buffer,
      write data to the memory addresses stored in the buffer, and
      increment the second counter value when the data has been written to all the addresses stored in the buffer.

9. The network device of claim 8, the memory allocation unit further configured to:
   pass the first and second counter values to the data sources in response to each of the write requests.

10. The network device of claim 9, the memory allocation unit further configured to:
    receive read requests from the data sources, each of the read requests comprising the first and second counter values; and
    return error messages to the data sources, indicating that the data written to the memory addresses has been aged, based on the read request first and second counter values.

11. A method of managing memory, comprising:
    maintaining a pool of memory addresses for writing data to a memory;
    retrieving memory addresses from the pool and storing the retrieved memory addresses in a buffer;
    writing the data to memory addresses stored in the buffer; and
    incrementing a first counter value when the data has been written to all the addresses stored in the buffer.

12. The method of claim 11, wherein the buffer comprises a circular buffer.

13. The method of claim 11, wherein the pool comprises a first-in-first-out queue.

14. The method of claim 11, further comprising:
    receiving read requests comprising tag values.

15. The method of claim 14, further comprising:
    reading selected ones of the data from one or more selected memory addresses if the tag values match other tag values stored in a table.

16. The method of claim 15, further comprising:
    deallocating the one or more selected memory addresses.

17. The method of claim 14, further comprising:
    returning an error message indicating that the data from the one or more selected memory addresses has been aged when the tag values fail to match a tag value stored in a table.

18. A network device, comprising:
    a memory configured to:
       store a pool of memory addresses for writing data to the memory,
       store a first counter value, and
       maintain a buffer; and
    a memory allocation unit configured to:
       retrieve memory addresses from the pool and store the retrieved memory addresses in the buffer,
       write data to memory addresses stored in the buffer; and
       increment the first counter value when the data has been written to all the addresses stored in the buffer.

19. The network device of claim 18, wherein the buffer comprises a circular buffer.

20. The network device of claim 18, wherein the pool comprises a first-in-first-out queue.

21. The network device of claim 18, the memory allocation unit further configured to:
    receive read requests comprising tag values.

22. The network device of claim 21, the memory allocation unit further configured to:
  read selected ones of the data from one or more selected memory addresses if the tag values match other tag values stored in a table.

23. The network device of claim 22, the memory allocation unit further configured to:
  deallocate the one or more selected memory addresses.

24. A system, comprising:
  a data structure encoded on a computer-readable medium, comprising:
    first data comprising a pool of addresses for at least one of writing and reading other data to and from a memory, and
    second data comprising a counter value that indicates a number of times the pool has been emptied of memory addresses and then replenished; and
  a unit configured to use the first and second data in allocating or de-allocating memory for memory read/write operations.

25. A system, comprising:
  a data structure encoded on a computer-readable medium, comprising:
    first data comprising a list of memory addresses obtained from a memory address pool, and
    second data comprising a counter value that indicates a number of times other data has been written to all the memory addresses in the list; and
  a unit configured to use the first and second data in allocating or de-allocating memory for memory read/write operations.

26. The system of claim 25, the data structure further comprising:
  third data comprising pointers to each of the memory addresses in the list,
  wherein the unit is further configured to use the third data in allocating or de-allocating memory for memory read/write operations.

27. The system of claim 25, the data structure further comprising:
  third data comprising a counter value that indicates a number of times the memory address pool has been emptied of memory addresses and then replenished,
  wherein the unit is further configured to use the third data in allocating or de-allocating memory for memory read/write operations.

28. The system of claim 25, the data structure further comprising:
  third data comprising flags that indicate whether each of the memory addresses have been allocated for a memory write operation,
  wherein the unit is further configured to use the third data in allocating or de-allocating memory for memory read/write operations.

29. A system for managing memory, comprising:
  means for maintaining a pool of memory addresses for writing data to a memory;
  means for retrieving memory addresses from the pool in response to write requests from data sources;
  means for replenishing the memory addresses in the pool when the pool is emptied; and
  means for incrementing a first counter value in response to each replenishment of the memory addresses in the pool.

* * * * *